(12) United States Patent
Eszlinger

(10) Patent No.: US 10,479,591 B1
(45) Date of Patent: Nov. 19, 2019

(54) AUTOMATED TIP JAR PRODUCING A COMPENSATING ACTION

(71) Applicant: Kris L. Eszlinger, Hungtington Beach, CA (US)

(72) Inventor: Kris L. Eszlinger, Hungtington Beach, CA (US)

(73) Assignee: Good Fortune Industries, LLC, Huntington Beach, CA (US)

( * ) Notice: Subject to any disclaimer, the term of this patent is extended or adjusted under 35 U.S.C. 154(b) by 131 days.

(21) Appl. No.: 15/701,197

(22) Filed: Sep. 11, 2017

(51) Int. Cl.
  *B65D 83/12* (2006.01)
  *G06Q 30/02* (2012.01)

(52) U.S. Cl.
  CPC ......... *B65D 83/12* (2013.01); *G06Q 30/0207* (2013.01)

(58) Field of Classification Search
  CPC .............. B65D 11/04; B65D 2203/12; B65D 83/0864; B65D 83/12; G06Q 20/20; G06Q 20/10; G06Q 20/24; G06Q 30/0279; G06Q 20/0655; G06Q 20/108; G06Q 40/125; G06Q 10/087; G07F 7/0886; G07F 19/00; G07F 7/08; G07F 9/06; G07F 17/42; G07F 11/007; G07F 17/329; G07G 1/14; G07G 1/12; G07G 1/0027; A45C 1/12; G07D 11/0093; G08B 3/10; G08B 7/06; G07B 3/04; G07B 7/00; G07B 1/00; G07B 3/02; B65H 1/08; B65H 2402/41; B65H 2701/1123; B65H 2701/1936; G07C 15/005

See application file for complete search history.

(56) References Cited

U.S. PATENT DOCUMENTS

| | | | | |
|---|---|---|---|---|
| 3,804,294 A * | 4/1974 | Householder | ........... | G07F 11/44 221/154 |
| 5,249,705 A * | 10/1993 | Gates | ...................... | G07F 11/68 221/15 |
| 5,735,432 A * | 4/1998 | Stoken | ................. | G07C 15/005 221/1 |
| 6,763,924 B2 * | 7/2004 | Olbrich | .............. | G06Q 30/0237 186/37 |
| 7,378,981 B1 * | 5/2008 | Sachs | ....................... | G08B 3/10 340/384.1 |
| 2006/0137549 A1 * | 6/2006 | Pallier | .................... | B41J 29/393 101/66 |

* cited by examiner

*Primary Examiner* — Jacob S. Scott
*Assistant Examiner* — Ayodeji T Ojofeitimi
(74) *Attorney, Agent, or Firm* — Gene Scott

(57) ABSTRACT

An apparatus for dispensing a coupon upon receiving a tip includes a housing enclosing an interior space wherein a first slot is positioned in the housing advantageously for receiving the tip and a second slot is positioned for dispensing the coupon. A magazine is mounted on top of a dispenser device within the housing wherein the magazine is adapted for holding a stack of individual coupons. The dispenser is able to frictionally move each coupon into contact between a nip roller and a pressing idle roller wherein a dispensed coupon is positioned to be removed manually. The apparatus is adapted to perform a light and sound show upon receiving a tip.

4 Claims, 7 Drawing Sheets

US 10,479,591 B1

AUTOMATED TIP JAR PRODUCING A COMPENSATING ACTION

FIELD OF THE DISCLOSURE

This invention relates to a combined gratuity collecting and display device that is intended to be placed in bars, restaurants, and similar establishments where tips and gratuities are often given.

BACKGROUND

When visiting an establishment where tips and gratuities are often given, there is usually a receptacle, commonly referred to as a "tip jar", where patrons can insert a tip or gratuity. If the establishment is frequented often, or the services of an employee will be used again in the near future, such as a bartender or barista providing drinks, patrons may want the employee to see the patron giving the tip or gratuity in hopes that the employee will give the patron improved service in the future, Unfortunately, one problem with the common tip jar is that there is no signal or other type of notification when a patron inserts a tip or gratuity into the tip jar. Therefore, what is needed is a device and method that provides a notification when a tip or gratuity is inserted into the tip jar. U.S. Pat. No. 8,169,336 to Watson dated May 1, 2012 discloses a tip jar having sensors such that when a tip is inserted into the apparatus, a light display and/or an audible output such as a jingle, or a vibration occurs. U.S. Pat. No. 7,378,981 to Sachs dated May 27, 2008 discloses a tip jar having a sensor for detecting a person depositing a tip. Once a person is detected a light and sound performance occurs. U.S. Pat. No. 7,321,304 to Soffer dated Jan. 22, 2008 discloses a tip jar having a tip receiving receptacle and an electronic circuit in a space below the receptacle. U.S. Pat. No. 7,059,477 to Wolf, II et al dated Jun. 13, 2006 discloses a tip jar having a tip receiving receptacle with a coin/paper separator which allows coins to pass to a lower chamber thereby separating coins from greenbacks. Application: 2011/0016046 to Lindstrom et al dated Jan. 20, 2011 discloses an apparatus capable of receiving cash, storing cash, and producing a receipt, and communicating using the Internet. Design Pat. D491335 to Nwadike dated Jun. 8, 2004 discloses a tip jar having a round cylindrical shape with a cinched waist, a flat top and bottom surfaces, a slot on top, and optional window and a slide mechanism in its side surface.

SUMMARY OF THE DISCLOSURE

The disclosed invention is a mechanized tip jar wherein the entry of a tip produces a light and sound show and dispenses a coupon. The present invention solves the above-described problem by providing a device and method that provides some type of notification when a tip or gratuity is given by a customer or patron. The gratuity receptacle includes an opening that is large enough to accept the type of gratuity typically given. The gratuity is stored in a cavity inside the receptacle and may be later collected. In use, patrons insert gratuities whereupon gravity or a mechanical means transfers the gratuity from the opening onto the cavity. A gratuity sensor may be a mechanical sensor, motion sensor or other type of sensor that is able to detect when the gratuity is traveling from the opening to the cavity that stores the gratuity. In one embodiment, the electronics necessary to operate the gratuity receptacle are integrated into the gratuity receptacle. In another embodiment, the base of the gratuity receptacle contains the electronics necessary to operate the system. The electronics may be in communication with the gratuity sensor such that when a gratuity is detected, an electronic circuit activate a notification. The signal may be an electrical signal or a mechanical signal depending on the sensing device. The electronics activate the notification means and notifies those proximate to the gratuity receptacle that a gratuity has been added to the receptacle. The notification may be any combination of a visual, motion, and/or a sound notification. The visual notification may be blinking lights or a rotating scene or an advertisement visible on the receptacle. The motion notification may be such that the gratuity receptacle vibrates or moves when activated. The sound notification may be a siren or audible tone such as an advertising jingle.

These and other aspects of embodiments herein described will be better appreciated when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

In this document, the terms "a" or "an" are used, as is common in patent documents, to include one or more than one. Furthermore, the term "or" is used to refer to a nonexclusive "or," such that "A or B" includes "A but not B," "B but not A," and "A and B," unless otherwise indicated.

BRIEF DESCRIPTION OF THE DRAWINGS

Drawing figures enclosed herewith are made a part of this specification of which the following descriptions pertain, but the figures should be taken only as examples. Reference numerals related to the same element in the same or different figure are maintained.

DETAILED DESCRIPTION

Figure 1:
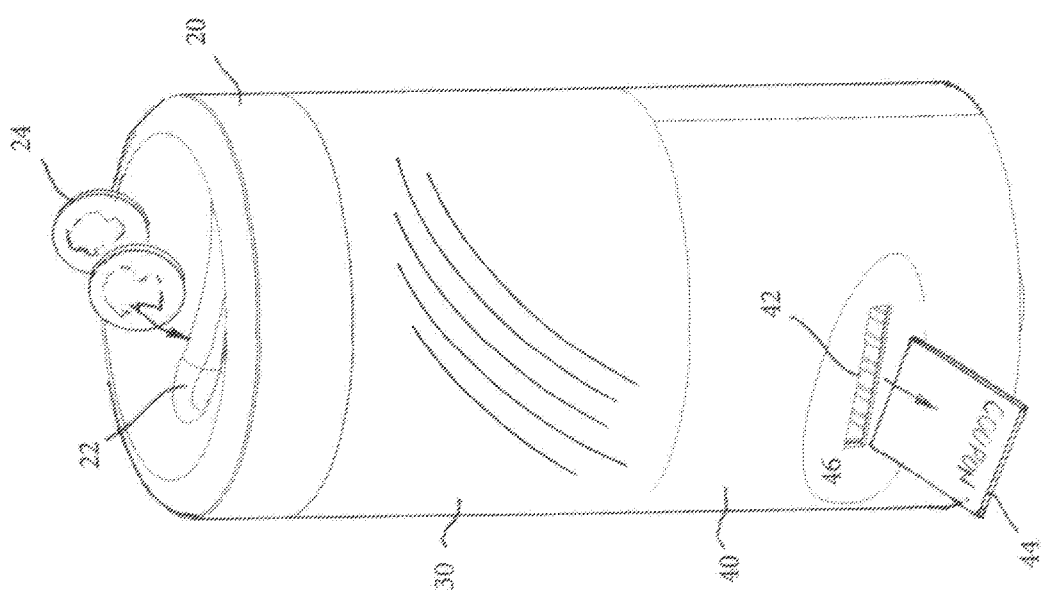
FIG. 1 is a front perspective view of the described apparatus showing tip coins entering and a coupon exiting.
Figure 2:
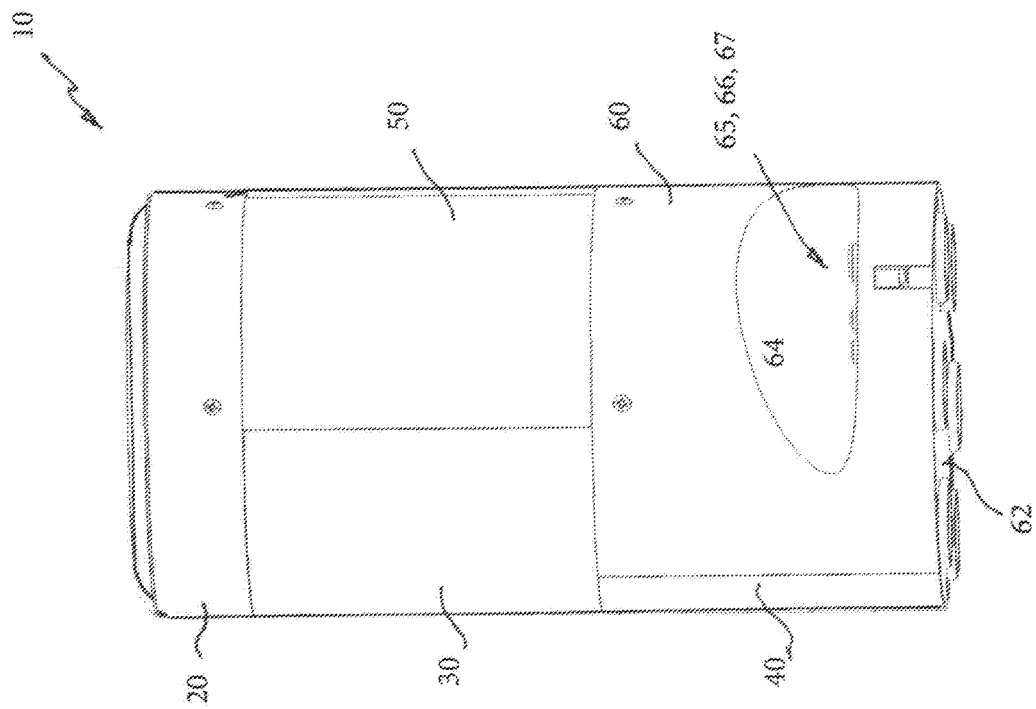
FIG. 2 is a rear perspective view thereof showing test switches.

The present disclosure relates to an apparatus 10 useful for receiving and storing gratuities (tips) and for rewarding a tip giver at the same time. FIGS. 1 and 2 illustrate apparatus 10 as viewed exteriorly, showing surface contours in a preferred embodiment. As shown in FIGS. 1 and 2 apparatus 10, in one embodiment, may be enclosed by an upper housing 20, a transparent tip jar 30, a front lower housing 40, a tower body 50, and a back lower housing 60 which includes a lower housing underside 62 functional as a stable base upon which apparatus 10 may be rested. These elements may fully enclose apparatus 10 while providing for an inlet 22, located in a top surface of upper housing 20 which may be used for receiving cash 24 such as service tips in the form of paper money and coins. Also, an outlet 42 may be located in front lower housing 40 wherein coupons 44 may be dispensed as shown in FIG. 1. It should be understood that the shape of apparatus 10 and the parts that make up its enclosure may be as shown, similar to what is shown, or may vary somewhat from what is shown. The term "coupon 44" is used here generically to refer to any item that is of flat construction and may be made of paper, cardboard, plastic and similar materials. As will be shown, coupon 44 must be of a certain size or within a certain size range in order to be stored within apparatus 10 and then dispensed through outlet 42. As will be described, it is one objective of apparatus 10 to dispense a coupon 44 at each instance that cash 24 is delivered into tip jar 30 through inlet 22. As said, tip jar 30 may be of a transparent plastic such as polycarbonate so that one can see tips previously received within jar 30.

Figure 3:
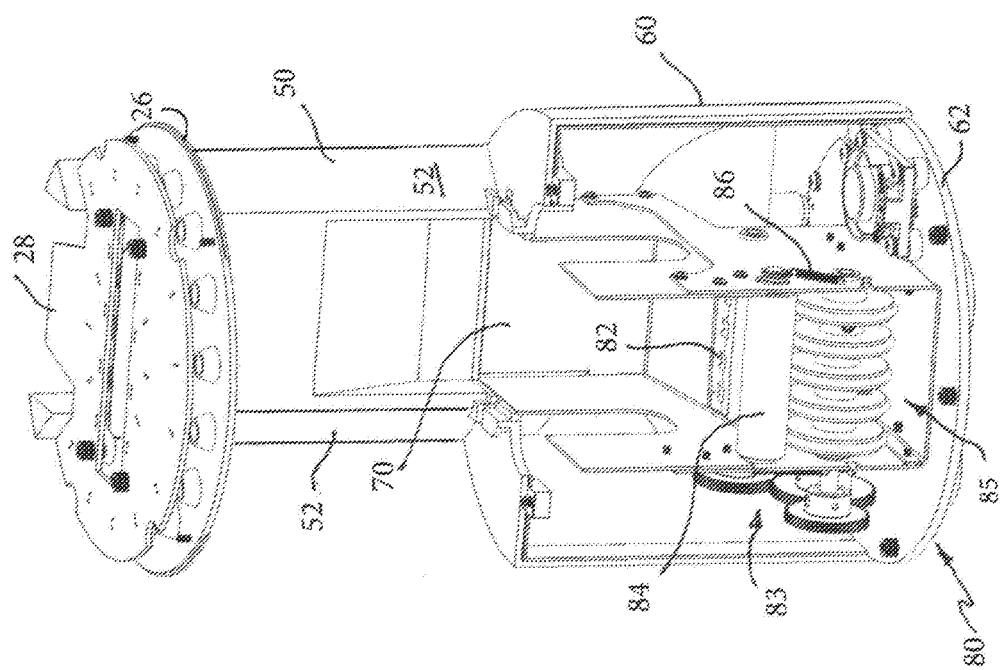
FIG. 3 is a front perspective view thereof showing interior elements.
Figure 4:
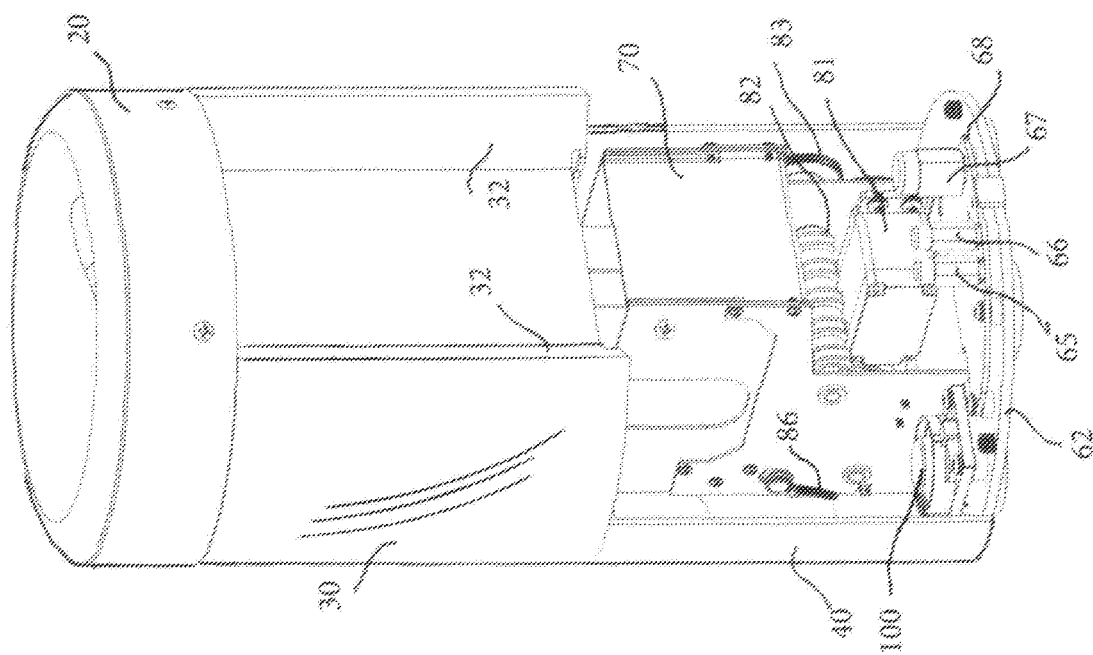
FIG. 4 is a rear perspective view thereof showing interior elements.

FIGS. 3 and 4 illustrate interior elements of apparatus 10 wherein, in FIG. 3, upper housing 20, tip jar 30, and front lower housing 40 are shown removed, and in FIG. 4, back lower housing 60 is removed. In these two views magazine 70, dispenser 80, upper housing underside 26, upper circuit board 28, and tower body 50 are illustrated.

Magazine 70, as shown, may be mounted on top of dispenser 80. Magazine 70 has space for holding a stack of individual coupons 44 (not shown). Dispenser 80, as shown, includes a drive motor 81, a drive roll assembly 82, (FIG. 4), a gear set 83, an idle roller 84, and a nip roller assembly 85 (FIG. 3). Further details of dispenser 80, it minor fasteners and other features are not described as it is within the skill set of a standard mechanic to arrange the elements described and shown (elements 81-85) to perform the function of dispensing coupon 44 from magazine 70.

This function proceeds as follows: when electrical power is applied to drive motor 81 it rotates driving drive roll assembly 82 via gear set 83. Drive roll assembly 82 is in contact with the bottom-most coupon 44 in the stack of coupons 44 stored within magazine 70 so that this bottom most coupon 44 is pushed forward so as to be caught between idle roller 84 and nip roll assembly 85. Nip roll assembly 85, driven by gear set 83, picks up coupon 44 as it is moved forward by drive roll assembly 82. This action projects a leading portion of coupon 44 through outlet 42 but does not release coupon 44 as rotation of nip roll 85 stops prior to release. It is assumed that a person dropping a tip into inlet 22 will hear the coupon dispensing sound of motor 81 and notice the extending coupon, and pull it out of outlet 42. This is easily accomplished as idle roll 84 is held in contact with coupon 44 against nip roll assembly 85 by expansion spring 86 which is of moderate tension.

Figure 5:
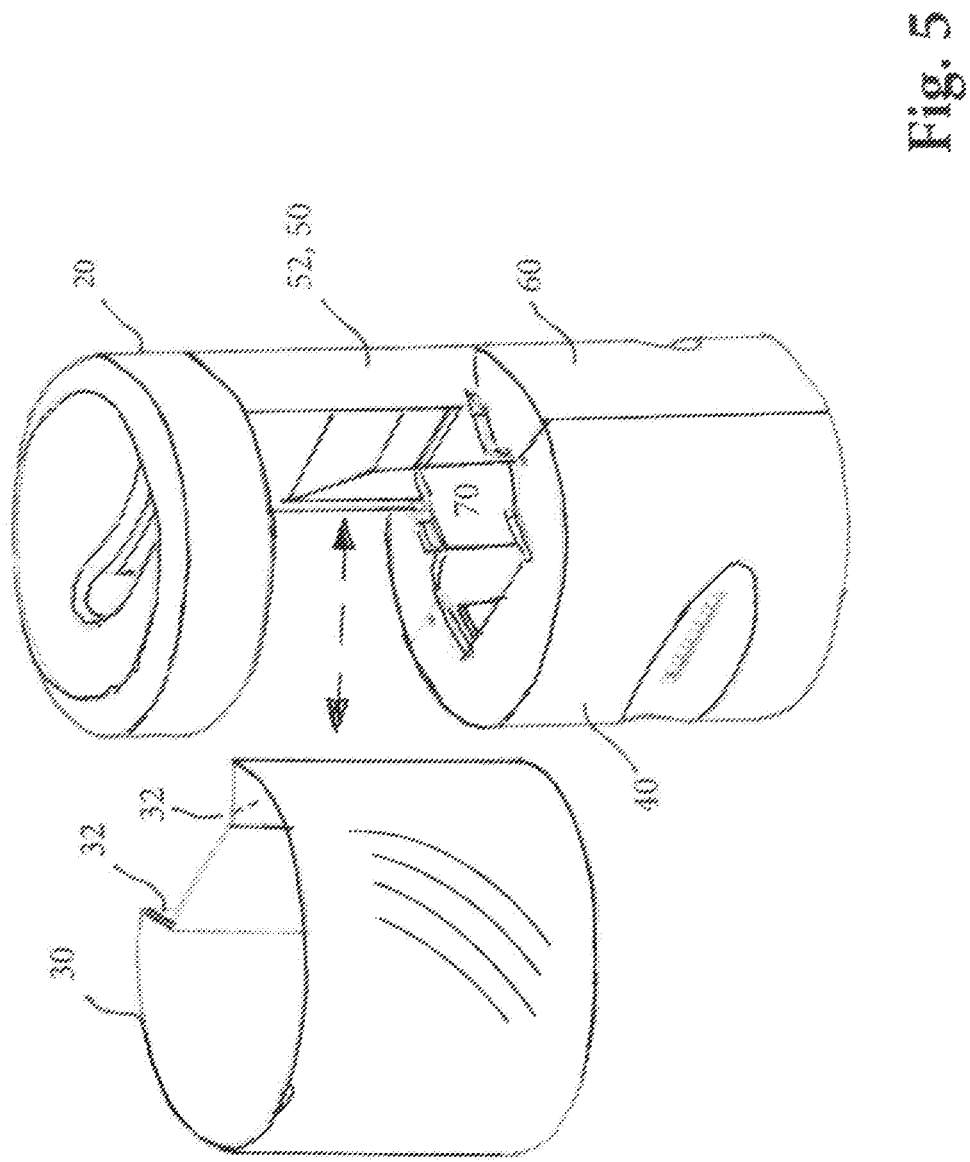
FIG. 5 is a side perspective view thereof showing removal of a tip jar.

When all coupons 44 have been dispensed, it is necessary to replenish it. This is easily accomplished when tip jar 30 is removed from apparatus 10. Tip jar 30 is removed by gripping it on opposing sides and pulling forward as shown in FIG. 5. Tip jar 30 is held securely by friction or by the interaction of protrusions and opposing dimples between upper housing 20 and the front and back lower housings 40/60. Also, tip jar 30 and tower body 50 have mutually contacting surfaces 32 and 52 which nest when tip jar 30 is fully inserted into apparatus 10. This prevents tip jar 30 from rotating, or otherwise moving out of position once it is fully inserted.

FIGS. 1 and 2 show recesses 46 and 64 within front lower housing 40 and back lower housing 60 respectively. Manually operated switches 65, 66, 67 are mounted within recess 64 and are shown as well in FIG. 4 as mounted on a lower circuit board 68. Recess 64 prevents inadvertent actuation of these switches, as for instance, when apparatus 10 is handled, picked up, moved, etc.

Figure 6:
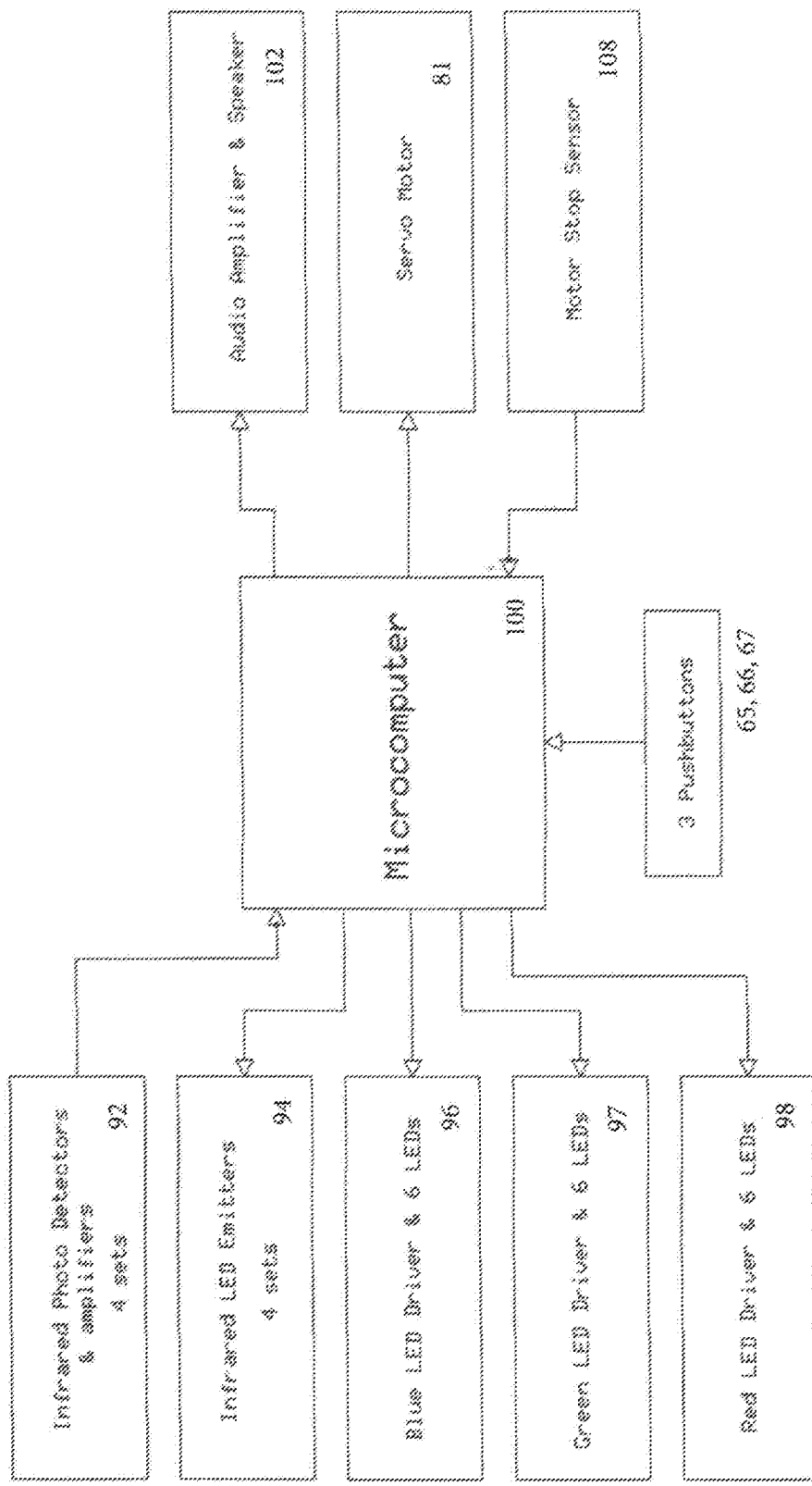
FIG. 6 is a block diagram showing major components thereof and primary control or power signal transfers.

The block diagram of FIG. 6 shows major components of the electrical circuits of apparatus 10, including infrared photo detectors 92, infrared led emitters 94, LED drivers and their LED lamps, 96, 97, and 98, which are mounted on upper circuit board 28, and microcomputer 100 pushbutton switches 65, 66, 67, audio amplifier and speaker 102, servo motor 81, and a motor stop sensor 104, which are mounted on lower circuit board 68 (FIG. 4).

Figure 7:
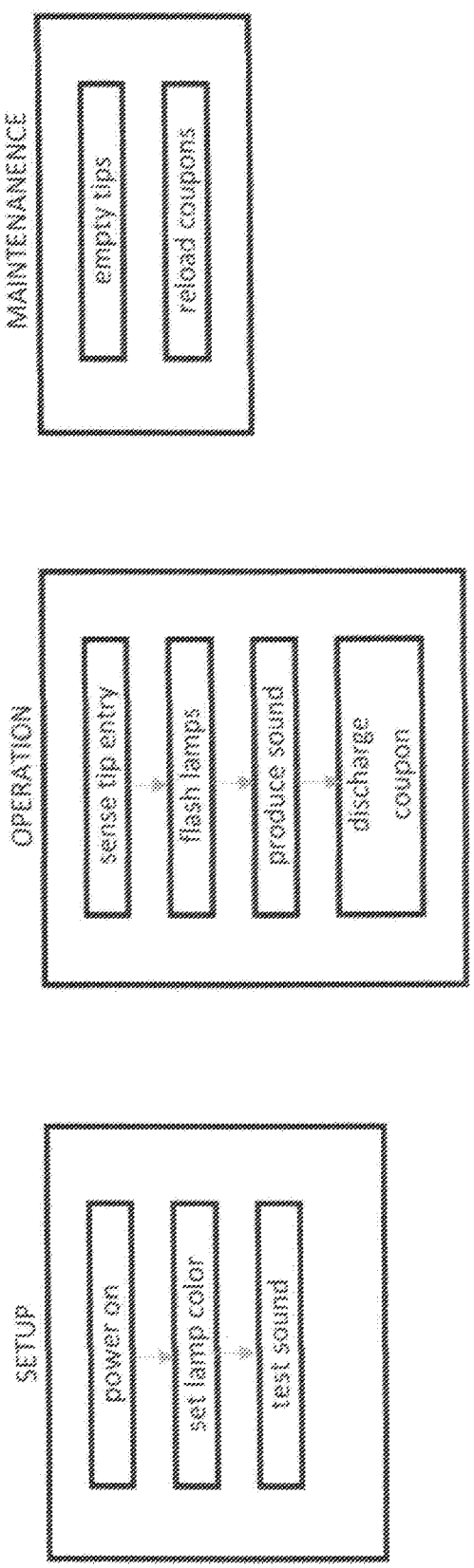
FIG. 7 is a functional logic diagram showing operation thereof.

The functional logic diagram of FIG. 7 shows operation of apparatus 10. At left in this diagram we see the setup phase of operation where power, preferably a battery, is switched on, thereby energizing circuit boards 28 and 68. Lamp color is selected by one of switches 65, 66, 67 to enable one of drivers 96, 97, or 98, and this illumination lights up tip jar 30 in the selected color: blue, green, or red. No color can also be selected if desired. Another of switches 65, 66, 67 enable selection of which stored sound is selected out of a library of sounds such as, "Thank You," "Many Thanks," "take a coupon" and others. Finally, switches 65, 66, 67 enable the coupon dispensing function and the sound that is produced at that time via audio amplifier 102 as a test. During operation, as shown, the passage of coins or greenbacks through inlet 22 is detected by photo detectors 92 when an infrared beam produced by emitters 94 is broken. Microcomputer enables the flashing of led lamps 96, 97, or 98, if active, and at the same time open the circuits that operate servo motor 81, the audio amplifier and speaker 102, and motor stop sensor 108. A coupon is discharged. As further shown in FIG. 7, collected tips in tip jar 30 may be removed, and if necessary, coupons may be added into magazine 70.

The previous description of the disclosed embodiments is provided to enable any person skilled in the art to make or use the disclosed apparatus 10. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but should be accorded the widest scope possible consistent with the principles and novel features as defined by the following claims. In this description, embodiments are described as a plurality of individual parts, and methods as a plurality of individual steps and this is solely for the sake of illustration. Accordingly, it is contemplated that some additional parts or steps may be added, some parts or steps may be changed or omitted, and the order of the parts or steps may be re-arranged, while still maintaining the sense and understanding of the apparatus system and methods of its use as claimed.

What is claimed is:

1. An apparatus for dispensing a coupon upon receiving a tip, said apparatus comprising:
    a housing having an inlet positioned for receiving said tip and an outlet positioned for dispensing said coupon;
    wherein said housing has at least one switch positioned within a recess in said housing, wherein said at least one switch is enabled for testing operation of said apparatus.

2. The apparatus of claim 1 further including a tip jar in a position within said housing to receive said tips entering through said inlet.

3. The apparatus of claim 1 further comprising a motion sensor positioned and enabled for detecting objects entering through said inlet.

4. The apparatus of claim 3 further comprising at least one of lighting and sound producing devices wherein operations of least one of said devices are enabled by said motion sensor.

* * * * *